US010162482B2

(12) United States Patent
Lee

(10) Patent No.: US 10,162,482 B2
(45) Date of Patent: Dec. 25, 2018

(54) INFORMATION DISPLAY METHOD AND APPARATUS OF MOBILE TERMINAL

(71) Applicant: Samsung Electronics Co., Ltd., Gyeonggi-do (KR)

(72) Inventor: Seung Myung Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 997 days.

(21) Appl. No.: 14/329,066

(22) Filed: Jul. 11, 2014

(65) Prior Publication Data

US 2014/0331183 A1   Nov. 6, 2014

Related U.S. Application Data

(63) Continuation of application No. 13/206,878, filed on Aug. 10, 2011, now Pat. No. 8,839,149.

(30) Foreign Application Priority Data

Nov. 18, 2010   (KR) .................. 10-2010-0114907

(51) Int. Cl.
*G06F 3/14*   (2006.01)
*G06F 3/0482*   (2013.01)
*G06F 3/0488*   (2013.01)

(52) U.S. Cl.
CPC .......... *G06F 3/0482* (2013.01); *G06F 3/0488* (2013.01); *G06F 3/04883* (2013.01)

(58) Field of Classification Search
CPC ..................................... G06F 3/14; G06F 3/17

USPC .............. 715/781, 835, 825; 358/1.13; 379/265.03; 713/320; 707/696; 455/414.1
See application file for complete search history.

(56) References Cited

U.S. PATENT DOCUMENTS

| | | | |
|---|---|---|---|
| 7,360,174 | B2 | 4/2008 | Grossman et al. |
| 7,404,152 | B2 | 7/2008 | Zinn et al. |
| 2003/0066027 | A1 | 4/2003 | Nakagiri |
| 2003/0135572 | A1 | 7/2003 | Katada |
| 2004/0249650 | A1 | 12/2004 | Freedman et al. |
| 2006/0023116 | A1 | 2/2006 | Kunieda et al. |

(Continued)

FOREIGN PATENT DOCUMENTS

| | | |
|---|---|---|
| CN | 101556526 A | 10/2009 |
| CN | 101815283 A | 8/2010 |

(Continued)

OTHER PUBLICATIONS

Korean Search Report, dated Aug. 26, 2016.
(Continued)

*Primary Examiner* — Ruay Ho
(74) *Attorney, Agent, or Firm* — Cha & Reiter, LLC.

(57) ABSTRACT

A method and apparatus for displaying a list of information items selected depending on whether each information item contains certain information is provided. An information display method of the present invention includes displaying a list having at least one information item; classifying, when a user command is input, the at least one information item into shown-information item and hidden-information item according to a display rule; and modifying the list to show only the shown-information items.

16 Claims, 13 Drawing Sheets

(56) References Cited

U.S. PATENT DOCUMENTS

| | | |
|---|---|---|
| 2006/0246955 A1 | 11/2006 | Nirhamo et al. |
| 2007/0005449 A1 | 1/2007 | Mathew et al. |
| 2007/0250795 A1 | 10/2007 | Park |
| 2008/0010613 A1 | 1/2008 | Narioka et al. |
| 2008/0016465 A1 | 1/2008 | Foxenland |
| 2008/0270886 A1 | 10/2008 | Gossweiler et al. |
| 2008/0297485 A1 | 12/2008 | Park |
| 2009/0259975 A1 | 10/2009 | Asai |
| 2010/0026647 A1 | 2/2010 | Abe et al. |
| 2010/0039399 A1 | 2/2010 | Kim |
| 2010/0083111 A1 | 4/2010 | de los Reyes |
| 2010/0088641 A1 | 4/2010 | Choi |
| 2010/0093316 A1* | 4/2010 | Doppler ............ H04M 1/72522 455/414.1 |
| 2010/0153881 A1* | 6/2010 | Dinn ................ G06F 17/30572 715/825 |
| 2010/0161570 A1* | 6/2010 | Novak .............. G06F 17/30946 707/696 |
| 2010/0162105 A1 | 6/2010 | Beebe et al. |
| 2010/0186091 A1 | 7/2010 | Turner et al. |
| 2010/0211896 A1 | 8/2010 | Brown |
| 2011/0035697 A1* | 2/2011 | Rempel ................ G06F 9/4443 715/781 |
| 2011/0129133 A1 | 6/2011 | Ramos et al. |
| 2011/0149328 A1* | 6/2011 | Nakagiri .............. G06F 3/1204 358/1.13 |
| 2011/0206198 A1* | 8/2011 | Freedman ............ G06Q 30/06 379/265.03 |
| 2011/0282862 A1 | 11/2011 | Loeb et al. |
| 2011/0296312 A1 | 12/2011 | Boyer et al. |
| 2012/0110680 A1 | 5/2012 | Oliver et al. |
| 2014/0025971 A1* | 1/2014 | Yuan ........................ G06F 1/32 713/320 |

FOREIGN PATENT DOCUMENTS

| | | |
|---|---|---|
| CN | 101819500 A | 9/2010 |
| EP | 2 308 076 C2 | 5/2003 |
| JP | H09270969 A | 10/1997 |
| JP | 2003-23580 A | 1/2003 |
| JP | 2003-216630 A | 7/2003 |
| JP | 2003-271526 A | 9/2003 |
| JP | 2003-348479 A | 12/2003 |
| JP | 2006-99470 A | 4/2006 |
| JP | 2008-85398 A | 4/2008 |
| JP | 2010-061486 A | 3/2010 |
| JP | 2010-526491 A | 7/2010 |
| JP | 2012-504837 A | 2/2012 |
| KR | 10-2007-0075171 A | 7/2007 |
| KR | 10-2008-0046828 A | 5/2008 |
| RU | 2007 137 568 A | 4/2006 |
| WO | 2010/029506 A1 | 3/2010 |

OTHER PUBLICATIONS

Japanese Search Report, dated Nov. 1, 2016.
Chinese Search Report dated Apr. 19, 2016.
Korean Search Report dated Jan. 18, 2017.
Malaysian Search Report dated Feb. 28, 2017.
Japanese Search Report dated Mar. 28, 2017.
European Search Report dated Apr. 5, 2017.

\* cited by examiner

FIG. 7B

| INBOX | TEMP. BOX | RECYCLE BIN | DELETE BOX |

SINSEGAE MOLL   AM 10:52
ANSWER TO THE QUESTION

MIRAE ASSET SECURITIES   AM 10:51
WEEKLY PROSPECT...

FREE COLUMN GROUP   AM 10:30
PART TIME...

SHINHAN BANK   AM 08:30
INFORMATION FOR CUSTOMER...

SOOWON VALLEY   AM 08:00
RESERVATION APPROVAL...

INFORMATION DISPLAY METHOD AND APPARATUS OF MOBILE TERMINAL

CROSS REFERENCE TO RELATED APPLICATIONS

The present application is a Continuation of U.S. patent application Ser. No. 13/206,878 filed on Aug. 10, 2011, which claims the benefit of priority under 35 U.S.C. § 119 of an application filed in the Korean Intellectual Property Office on Nov. 18, 2010 and assigned Serial No. 10-2010-0114907, the contents of which are hereby incorporated by reference in its entirety.

BACKGROUND

1. Field of the Invention

The present invention generally relates to an information display method and apparatus. In particular, the present invention relates to a method and apparatus for displaying a list of information items that is selectable according to predetermined criteria.

2. Description of the Related Art

Recently, mobile terminals are becoming multimedia devices integrating various functions such as electronic organizer function, game console function, and schedule manager function. As the number of supplementary functions supported by a mobile terminal grows, the user interface plays a vital role in managing its functions and other services efficiently.

A mobile terminal has a limited display area to display large amount of information. For example, a user typically has to scroll up and down to see the entire page when using the navigation feature. Moreover, as the applications and contents supported by the mobile terminal are becoming more diversified in number and type, it is becoming challenging to comprehensively display all various types of information.

SUMMARY

In order to solve the problems of the prior art, the present invention provides an information display method and apparatus of a mobile terminal that is capable of facilitating the display of a list of information items on a size-constrained display screen by considering information relativity.

In accordance with an aspect of the present invention, an information display method of a mobile terminal includes displaying a list having a plurality of information items; classifying, when a user command is input, the information items into shown-information item and hidden-information item according to a predefined display rule; and modifying the list to show only the shown-information items.

In accordance with another aspect of the present invention, an information display apparatus of a mobile terminal includes a display unit which displays a list having a plurality of information items; an input unit which receives an information display configuration command; and a control unit which classifies, when the information display configuration command is input, the information items into shown-information item and hidden-information item according to a predefined display rule and modifies the list to show only the shown-information items by means of the display unit.

BRIEF DESCRIPTION OF THE DRAWINGS

FIG. 4A is a diagram illustrating an exemplary initial contact list displayed when entering a contact list menu in the information display method according to the first embodiment of the present invention;

FIG. 4B is a diagram illustrating an exemplary contact list configured with the shown-information items in the information display method according to the first embodiment of the present invention;

FIG. 4C is a diagram illustrating another exemplary contract list configured with the shown information items in the information display method according to the first embodiment of the present invention;

FIG. 7B is a diagram illustrating an exemplary email list configured with the shown-information items in the information display method according the fourth embodiment of the present invention.

DETAILED DESCRIPTION

In the following description, the term 'information item' denotes an item that can be selectively contained in a list according to whether the information item has the information intended by the user. Each information item can occupy a display region having a predetermined size.

In the following description, the term 'shown-information item' denotes the information item that appears in the list, and the term 'hidden-information item' denotes the information item that disappears in the list. Here, if a hidden-information item disappears, this means that the corresponding information item is shrunken or removed from an information display region which the information item occupies in active state.

In the following description, the term 'shown-information region' denotes a region for displaying an information item in the display screen of the mobile terminal, and the term 'hidden-information region' denotes a region for giving a clue of the hidden information item.

Exemplary embodiments of the present invention are described with reference to the accompanying drawings in detail. The same reference numbers are used throughout the drawings to refer to the same or like parts. For the purposes of clarity and simplicity, detailed description of well-known functions and structures incorporated herein may be omitted to avoid obscuring the subject matter of the present invention.

Figure 1:
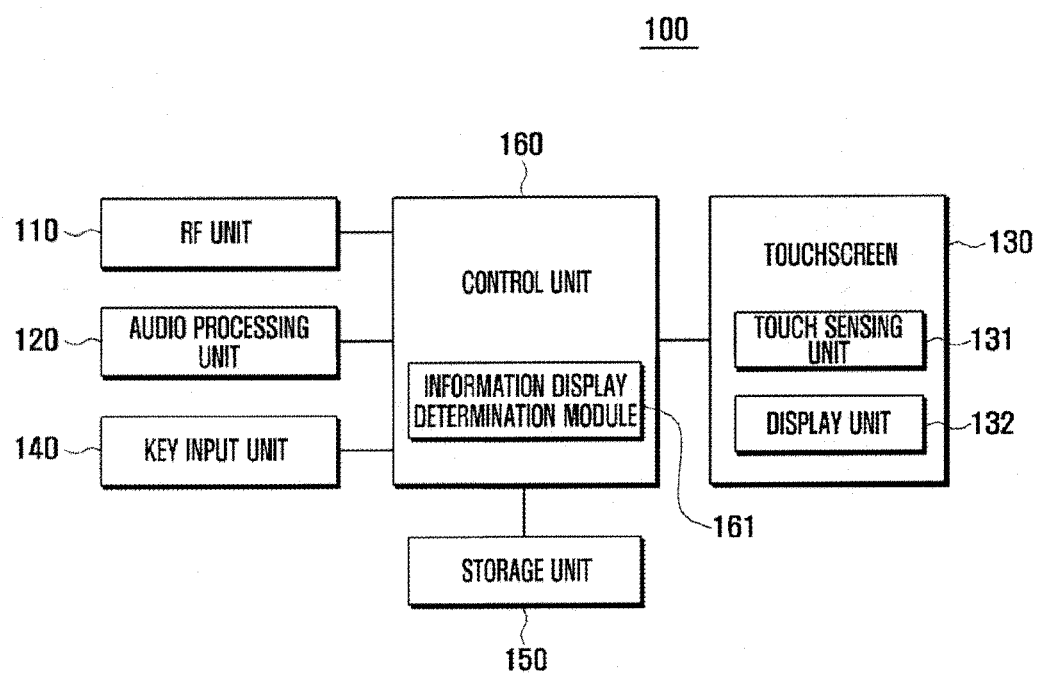
FIG. 1 is a block diagram illustrating a configuration of the mobile terminal according to an embodiment of the present invention.

FIG. 1 is a block diagram illustrating a configuration of the mobile terminal according to an embodiment of the present invention.

As shown, the mobile terminal 100 includes a Radio Frequency (RF) unit 110, an audio processing unit 120, a touchscreen 130, a key input unit 140, a storage unit 150, and a control unit 160.

The RF unit 110 is responsible for the radio communication function of the mobile terminal 100 for transmitting/receiving data. The RF unit 100 includes an RF transmitter for up-converting and amplifying the transmission signal and an RF receiver for low noise amplifying and down-converting the received signal. The RF unit 110 transfers the data received over a radio channel to the control unit 160 and transmits the data output by the control unit 160 over the radio channel.

The audio processing unit 120 includes a codec pack having a data codec for processing packet data and an audio codec for processing audio signal including voice. The audio processing unit 120 converts a digital audio signal to an analog audio signal by means of the audio codec to play out the audio signal through a speaker (SPK) and converts an audio signal input through a microphone (MIC) to a digital audio signal by means of the audio codec.

The touchscreen 130 includes a touch sensing unit 131 and a display unit 132. The touch sensing unit 131 detects a touch input made by the user on the screen. The touch sensing unit 131 can be implemented with one of capacitive overlay type, pressure type, resistive overly type, infrared beam type sensors, or a pressure sensor. The touch sensing unit 131 can also be implemented with other type of sensing devices that can detect a contact of or pressure by an object. The touch sensing unit 131 generates a detection signal including coordinates corresponding to a touch input made by the user and transfers the detection signal to the control unit 160. In case that the user makes a movement gesture without releasing the touch made on the screen, the touch sensing unit 131 generates the detection signal including the coordinates on the movement path and transfers the generated detection signal to the control unit 160. Here, the movement gesture can be categorized into one of a flick in which the movement speed is greater than a threshold speed and a drag in which the movement speed is equal to or less than the threshold speed.

The touch sensing unit 131 can detect a user input made for information display setting. In this case, the user input can be one of a pinch input in which two touch points are drawn nearer to each other in drag speed, a double tap input, a soft key input, etc.

The display unit 132 can be implemented with one of a Liquid Crystal Display (LCD), an Organic Light Emitting Diodes (OLED), and Active Matrix OLED (AMOLED), and output menus, user input data, function setting indication, and other information in the form of visual image. The display unit 132 also displays a booting screen, a standby screen, a menu screen, a call progressing screen, and other application execution screens.

The display unit 132 can present a shown-information region for displaying the shown-information item and a hidden-information region for displaying the hidden-information region. Alternatively, the hidden-information region can be a blank region which is not occupied by any information item. The hidden-information region also can be presented as if the information item is folded. A detailed description of processing the hidden-information item is described later.

Although the description is directed to a touchscreen-enabled mobile terminal 100, it should be noted that the teachings of the present invention can be applied to a mobile terminal implemented without a touchscreen. In such a case, the touchscreen 130 can be modified so as to work only with the display function of the display unit 132.

The key input unit 140 generates an input signal to the control unit 160 in accordance with the key manipulation of the user. The key input unit 140 can be implemented with a keypad having alphanumeric keys and navigation keys along with certain function keys formed at a side of the mobile terminal 100. In case of the touchscreen 130, the key input unit 140 can be omitted. The key input unit 140 can further include at least one soft key for display configuration.

The storage unit 150 stores programs and data necessary for the operations of the mobile terminal 100 and can be divided into a program region and a data region. The program region can store the programs for controlling the operations of the mobile terminal, the Operating System (OS) for booting up the mobile terminal 100, the application programs for playing multimedia contents, and other application programs for supporting the supplementary functions such as camera function, audio playback function, and still and motion picture playback function. The data region stores the data generated according to the use of the mobile terminal 100 such as picture, video, phonebook, and audio data.

The control unit 160 controls the overall operations of the internal function blocks of the mobile terminal 100. Particularly, the control unit 160 controls such that each of the information items constituting a list is shown or hidden according to whether the information item contains the user-intended information. The control unit 160 can include an information display determination module 161. In an alternate embodiment, the control unit 160 can implemented to perform the function of the information display determination module 161.

When a user input is detected, the information display determination module 161 analyzes the information items of the list. The information display determination module 161 determines the shown-information items and the hidden-information items according to a predefined display rule. Here, the display rule is used to determine whether to show or hide each information item depending on whether the information item has the user-intended information, whether the information item is mostly used information item, whether the information item has a priority selection or other urgency/emergency level.

Figure 2:
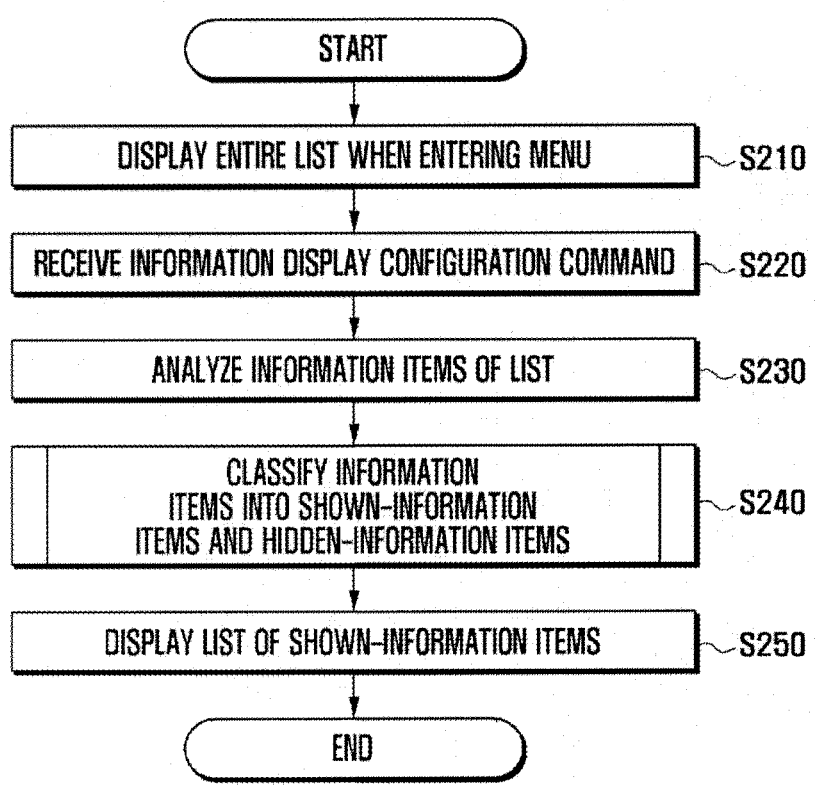
FIG. 2 is a flowchart illustrating an information display method of a mobile terminal according to an embodiment of the present invention.

FIG. 2 is a flowchart illustrating an information display method of a mobile terminal according to an embodiment of the present invention.

When entering the menu, the control unit 160 of the mobile terminal 100 controls the display unit 132 to display a list related to the menu (S210). Here, the list includes at least one information item.

Next, the control unit 160 detects a user input made for configuring information display condition (S220). According to an embodiment of the present invention, the user input for information display configuration can be made by a pinch input in which two touch points are drawn nearer to each other and sensed by the touch sensing unit 131. However, this information display configuration request input is not limited to the pinch input but can be made with a double touch at a specific area or button or a soft key designated for the information display configuration.

Next, the control unit 160 analyzes each information item of the list (S230). According to the analysis result, the control unit 160 determines whether to show or hide the corresponding information item (S240). A description relating to the determination on whether to show or hide the information is provided in more detail with reference to FIG. 3.

Figure 3:
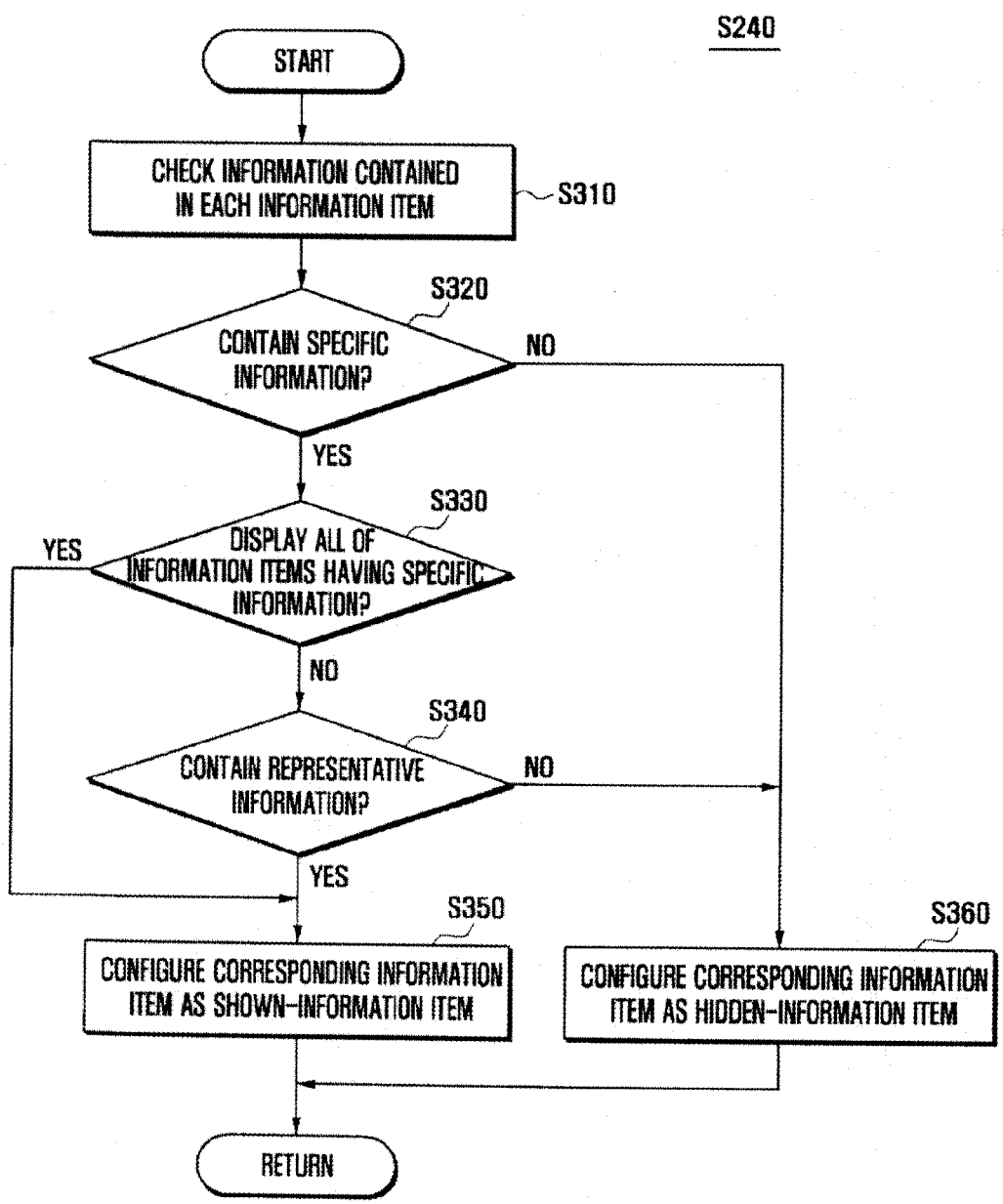
FIG. 3 is a flowchart illustrating the procedure for determining whether to show or hide an information item in the information display method of FIG. 2.

FIG. 3 is a flowchart illustrating the procedure for determining whether to show or hide an information item in the information display method of FIG. 2.

As shown, the control unit 160 checks the information contained in each of the information items from the list (S310). The type of the information can vary according to the list. For example, if the list is a contact list, the information item can contain the information such as an alphabetical index and a subscriber's contact. Alternatively, the list can contain the information such as a schedule title and content.

After checking the information contained in the information item, the control unit 160 determines whether information item contains the user-intended information (S320), and the procedure branches out to step S330 or S360. If the information item does not contain the user-intended or desired information, the control unit 160 configures the information item as a hidden-information item so as to prevent the display from the list (S360).

Otherwise, if the information item contains the user-intended information, the control unit 160 determines whether to show all of the information items containing the user-intended information in the list (S330). Alternatively, whether to show all of the information items containing the user-intended or desired information can be preconfigured by the user. If it is determined to show all of the information items containing the user-intended information at step S330, the control unit 160 configures the corresponding information item as the shown-information item so as to be shown in the list (S350).

If it is determined not to show all of the information items contained the user-intended information at step S330, the control unit 160 determines whether the corresponding information item contains the relevant representative information (S340). Here, the control unit 160 controls such that the list composed of the information items having specific information is displayed on the display unit 132.

If the corresponding information item contains the representative information, the control unit 160 configures the information item as the shown-information item so as to be shown in the list (S350). The representative information can be different according to the type of the list. For example, if the list is a contact list, the representative information can be an alphabet index for sorting out the registered subscribers into certain groups. In another exemplary case of a daily schedule, the representative information can be the schedule title excerpted from the schedule content.

In contrast, if the information item does not contain the representative information, the control unit 160 configures the information item as a hidden-information item so as to be hidden in the list (S360).

Although the description is directed to the case where the information item is configured to be shown or hidden in the list depending on the whether the information item contains the representative information, it should be noted that the present invention is not limited thereto. For example, the information items can be sorted by priority or urgency/emergency level such that each information item can be configured accordingly.

After configuring the shown-and-hidden information items, the procedure returns to FIG. 2. Finally, the control unit 160 controls the display unit 132 to display the list configured to have the information items (S250). In this case, the control unit 160 can display the shown-information items in at least one information display region.

Meanwhile, the control unit 160 can control such that the hidden-information items are clued in the hidden-item regions indicating existence of hidden-information items or not shown in the list which is described later.

A description is made of the information display methods according to the embodiments (first to fourth embodiments) of the present invention hereinafter.

First Embodiment

Figure 4A:
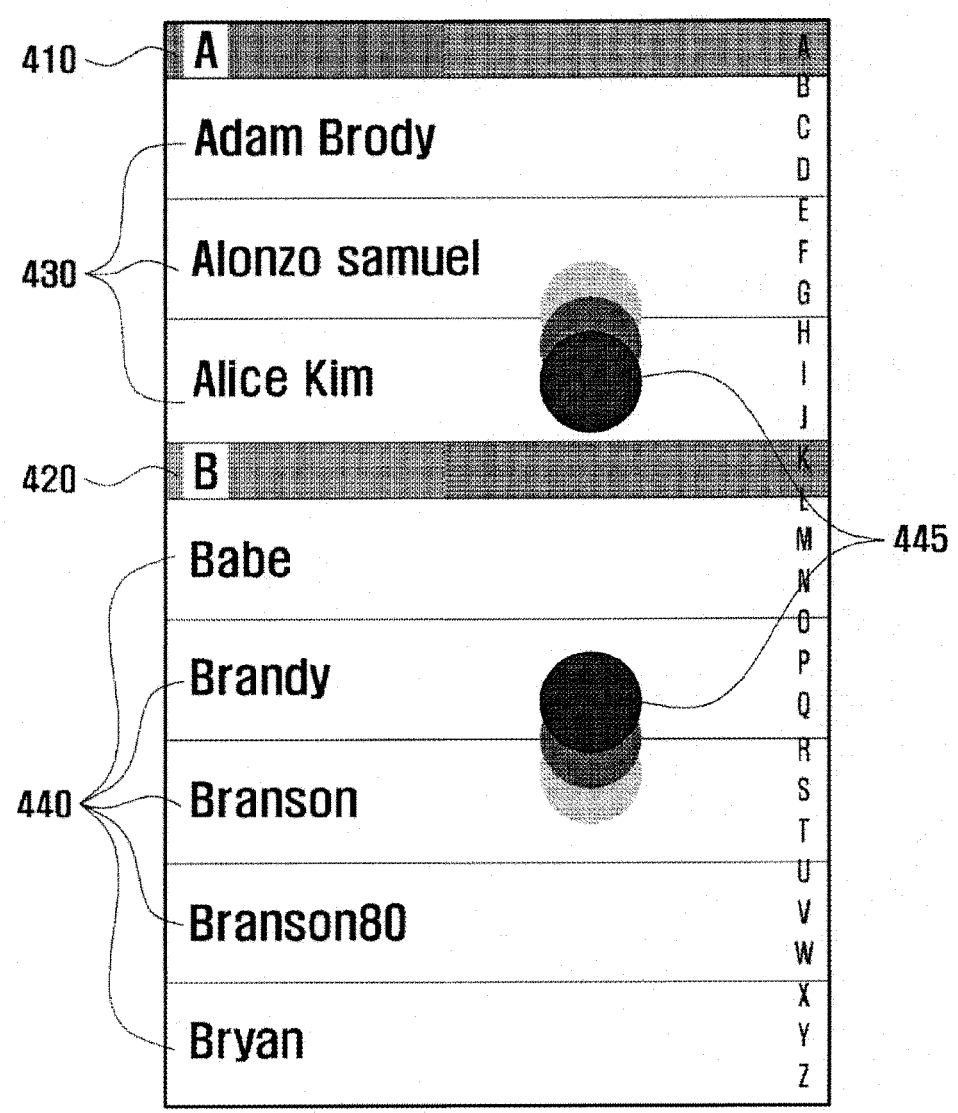
FIG. 4A, FIG. 4B and FIG. 4C are diagrams illustrating exemplary steps of the information display method of a mobile terminal according to the first embodiment of the present invention.
Figure 4B:
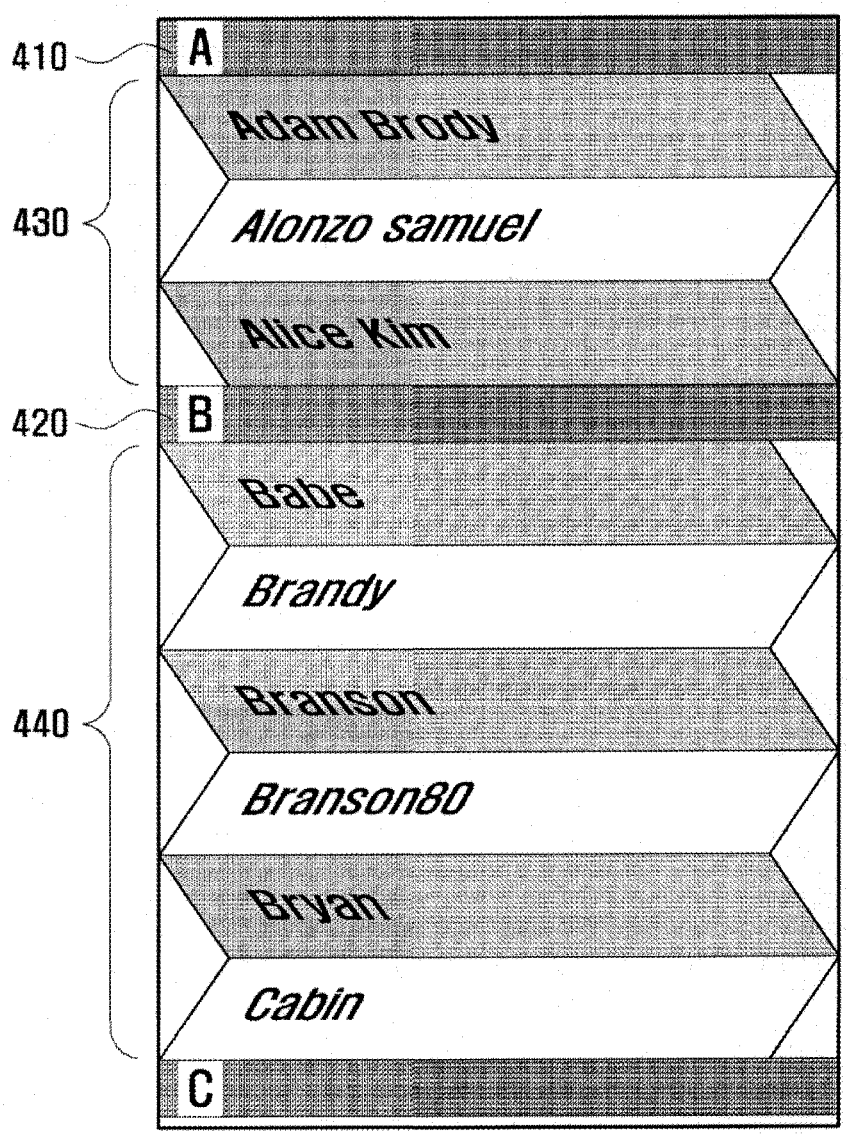
Figure 4C:
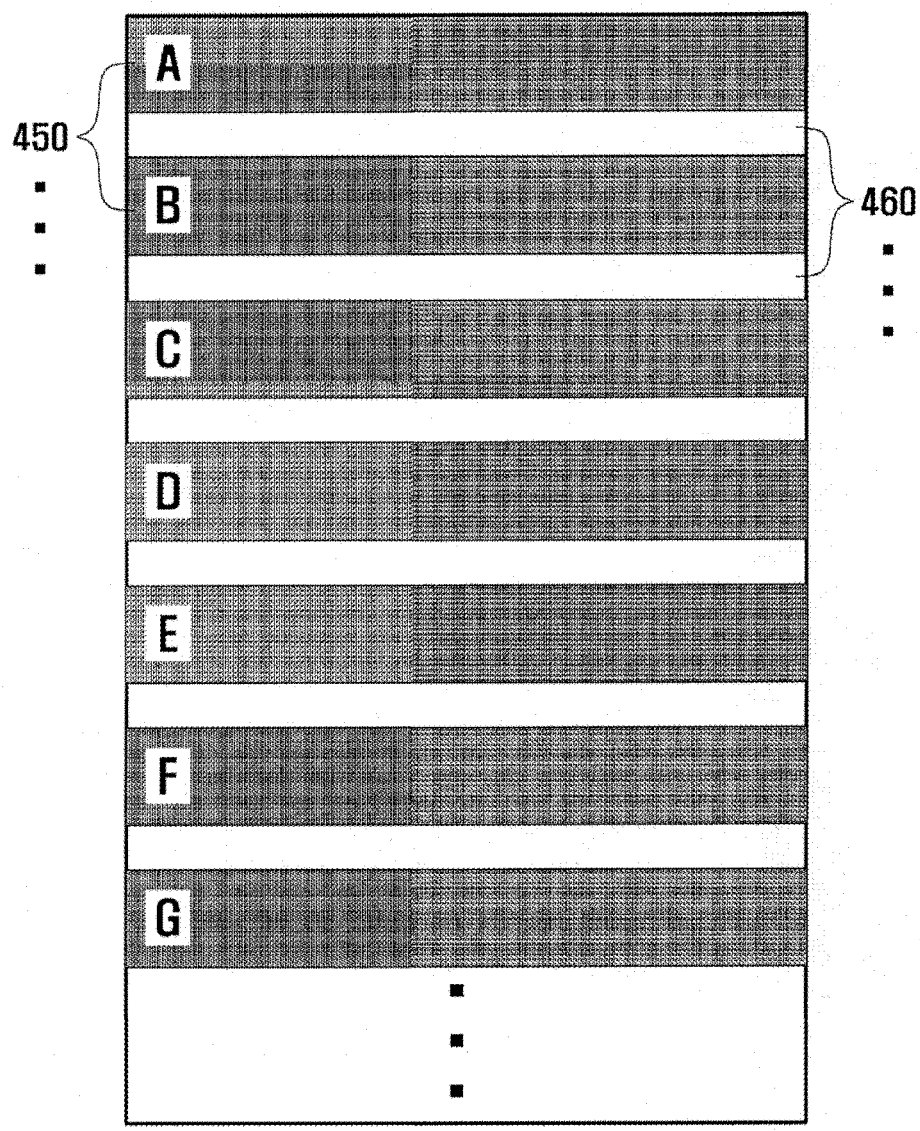

FIGS. 4A to 4C are diagrams illustrating exemplary steps of the information display method of a mobile terminal according to the first embodiment of the present invention.

When entering the contact list menu mode, the mobile terminal 100 displays the list of contact items representing contacts (e.g., individual, organizations, or corporations) sorted by an order as shown in FIG. 4A. The contact list includes at least one alphabetic group 410 and 420 composed of at least one contact item 430 and 440. In this case, the contact items are classified into alphabetic information groups, and the alphabet indexing each alphabetic information group can be the representative information of the alphabetic information group.

As shown in FIG. 4A, it is impossible to display all of the contact items in the size-constrained display screen of the display unit 132. Accordingly, the user has to scroll up and down the list to search for a specific contact item. In order to mitigate the inconvenience of the scroll manipulation, the information display method of according to the present invention can display only the representative information in alphabetical order so as to provide the user with an overall view of each class/category for a quicker retrieval. To this end, if the user makes a pinch gesture as denoted by the reference number 445, the control unit 160 interprets the pinch gesture as an information display configuration command. Although the information display configuration command is input by the pinch gesture, other variation of hand inputs by a user can be used.

If the user input is detected, the control unit 160 analyzes the information item groups 410 and 420 and the information items 430 and 440 according to a predefined rule and classifies the information items into shown-information items and hidden information items. As shown in the embodiment of FIG. 4A, each of the alphabetic groups 410 and 420 includes the information of an alphabetic index, and each of the contact items 430 and 440 includes the information of registered contact.

When the information display configuration command is input, the predefined rule can be set so that only the representative information, i.e, alphabetical index, is displayed.

As described above, the alphabetic index can be the representative information in that it can be used for classifying the registered contacts into groups. Accordingly, the control unit 160 configures the information item groups 410 and 420 having the alphabet indices as shown-information items and the information contact items 430 and 440 as hidden-information items.

Thus, the control unit 160 controls such that the information groups 410 and 420 configured as shown-information items are displayed on the display unit 132.

FIG. 4B is a diagram illustrating an intermediate step of the information display method according to the first embodiment of the present invention.

In order to provide an aesthetic interface to the user, the control unit 160 can display the hidden-information items in half-folded shape as shown in FIG. 4B. Although they have been depicted in half-folded shape in FIG. 4B, the hidden-information items can expressed in other shape according to another embodiment of the present invention. For example, the contact items 430 and 440 can be arranged in the form of rounded curves or partially overlapped bars.

FIG. 4C is a diagram illustrating a screen after the intermediate step above where the contact list showing only the shown-information items are displayed according to the first embodiment of the present invention As shown in FIG. 4C, the contact list screen can be collapsed to include at least one shown-information region 450 and at least one hidden-information region 460. The shown-information regions 450 are indexed by the alphabets (i.e., A, B, C . . . ) and the hidden-information regions 460 are processed as blank spaces without displaying any information. In this manner, the contact list is displayed only with the information items having the representative information so as to provide the user with a greater overview of the large amount of information on the size-constrained display screen. As a result, the user can navigate to the desired subclass of information quickly without the need of scrolling down the screen.

Although they are processed as blank spaces in FIG. 4C, the hidden-information region can be expressed in different way. For example, the hidden-information region 460 can be displayed in the form of icon or text for indicating the existence of hidden-information item.

Second Embodiment

Figure 5A:
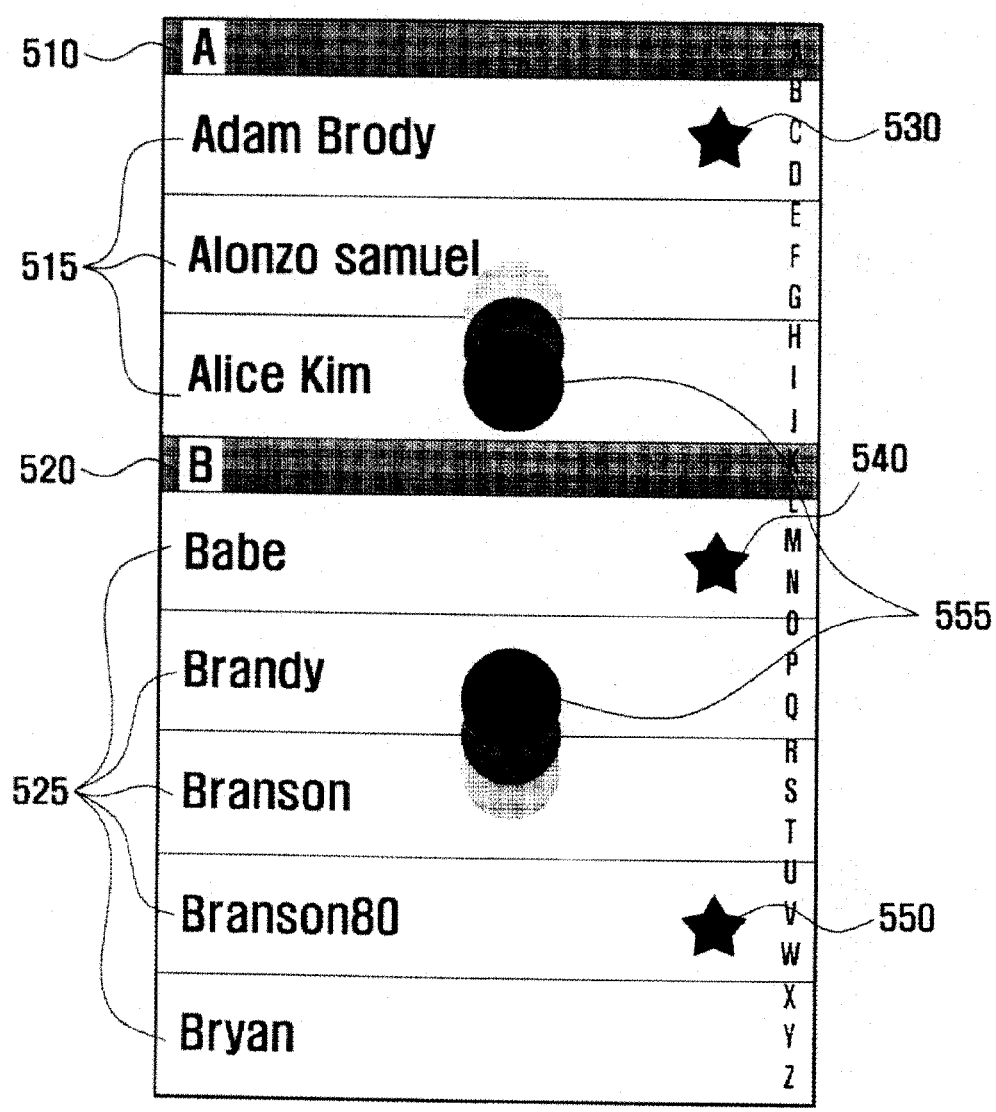
FIG. 5A is a diagram illustrating an exemplary initial contact list displayed when entering a contact list menu in the information display method according to the second embodiment of the present invention.
Figure 5B:
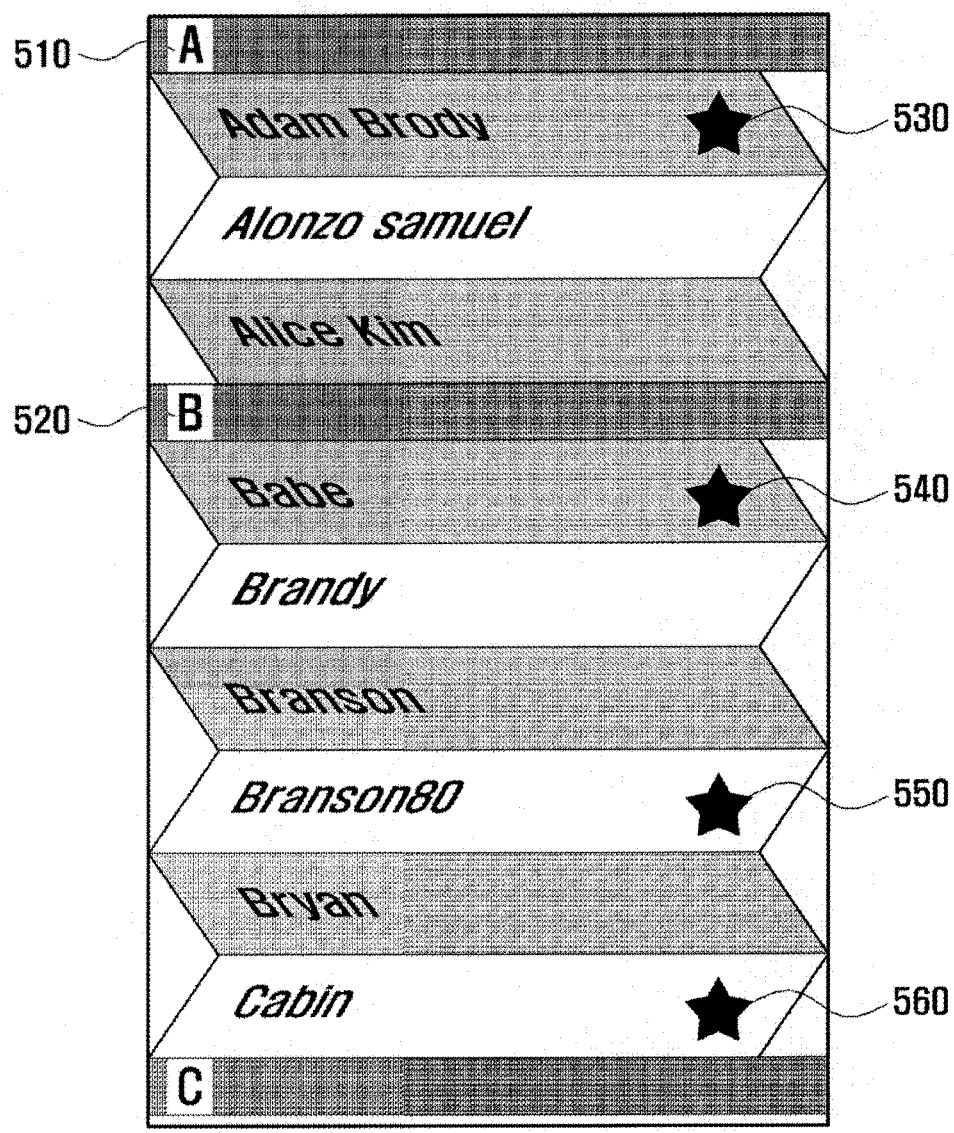
FIG. 5B is a diagram illustrating an exemplary contact list configured with the shown-information items in the information display method according to the second embodiment of the present invention.
Figure 5C:
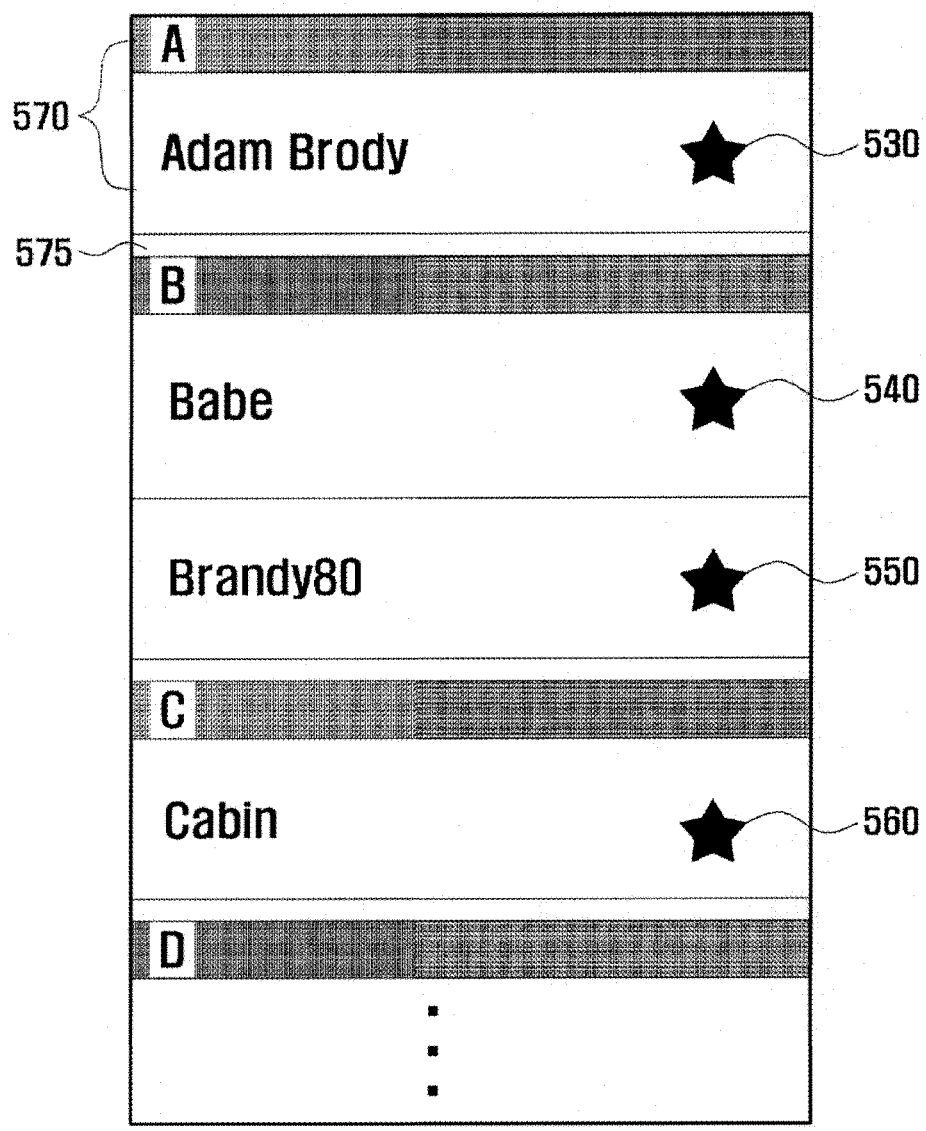
FIG. 5C is a diagram illustrating another exemplary contact list configured with the shown-information items in the information display method according to the second embodiment of the present invention.

FIGS. 5A to 5C are diagrams illustrating exemplary steps of the information display method of a mobile terminal according to the second embodiment of the present invention.

The second embodiment is similar to the first embodiment except that the contact list is composed of the user favorite contact items (or the contact items frequently selected to place a call).

When entering the contact list menu, the mobile terminal 100 displays the list of contact items representing contacts sorted by an order as shown in FIG. 5A. In FIG. 5A, the contact list includes at least one alphabetic group item 510 and 520 composed of at least one contact item 515 and 520. Similar to the first embodiment, each of the alphabetic group items 510 and 520 has the representative information shared by the contact items thereof.

As shown in FIG. 5A, the contact items can be assigned priority according to the user configuration. The priority can be determined according to the frequency or total time of the call to the corresponding contact or weight assigned to the contact. The contacts to which the priority is given are marked with symbols 530, 540, and 550. Alternatively, the user can pre-designates the preferred contact items for selection.

If a pinch gesture is made on the screen as denoted by reference number 555, the control unit 160 interprets the pinch gesture as the information display configuration command. The information display configuration command is input, the control unit analyzes the alphabetic group items 510 and 520 and the contact items 515 and 525 according to a predetermined rule and classifies the contact items into the shown-information item and hidden-information item. For this purpose, the control unit 160 determines whether the contact items 515 and 535 contain the information. As described with reference to FIG. 4A, all of the information items constituting the contact list include the information.

Since the alphabetic index is assumed as the representative information, the control unit 160 configures the alphabetic group item 510 and 520 having the alphabetic index as the shown-information items as in the first embodiment. However, in the second embodiment, the control unit 160 determines whether there is any information item to which the priority is given in the contact list. To this end, the control unit 160 identifies the information items to which the user has assigned the priority with the symbols 530, 540, and 550, and configures the information items having the priority as the shown-information items. Next, the control unit 160 configures the rest information items to which no priority is assigned as the hidden-information items.

FIG. 5B is a diagram illustrating an intermediate step of the information display method according to the second embodiment of the present invention.

In order to provide an aesthetic interface to the user, the control unit 160 can display the hidden-information items in half-folded shape during collapsing. Although they have been depicted in half-folded shape in FIG. 5B, the hidden-information items can expressed in other shape. For example, the contact items can be arranged in the form of rounded curves or partially overlapped bars.

FIG. 5C is a diagram illustrating a final screen outputting the contact list showing only the shown-information items according to the second embodiment of the present invention.

As shown in FIG. 5C, the contact list screen can include at least one shown-information regions 570 and at least one hidden-information region 570. The shown-information regions 570 are used for presenting the alphabetic group items 510 and 520 and the contact items 530, 540, 550, 560 to which the priority is given, and the hidden information regions 575 are displayed as blank spaces or in the form of icon or text for indicating existence of hidden-information item.

Third Embodiment

Figure 6A:
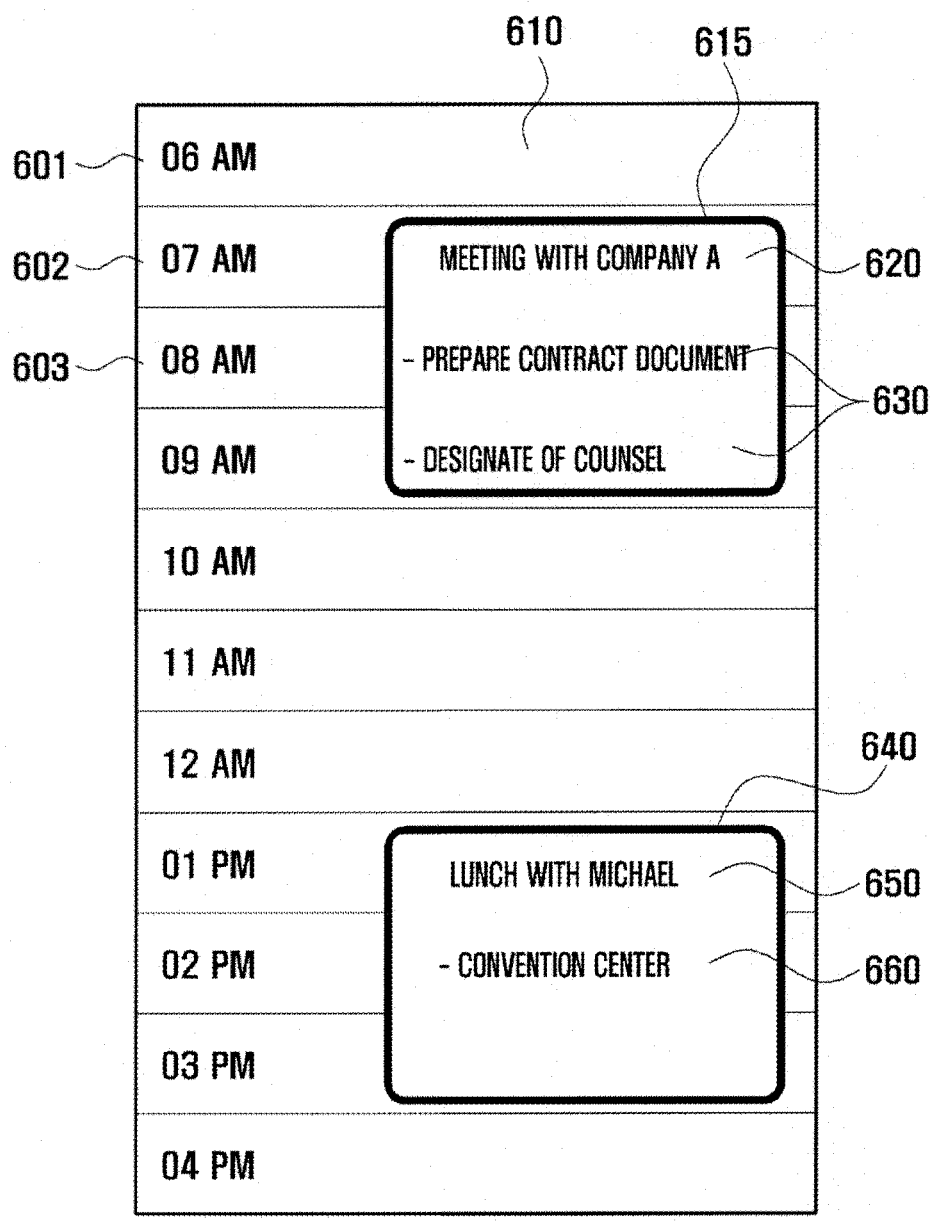
FIG. 6A is a diagram illustrating an exemplary initial schedule list displayed when entering a schedule list menu in the information display method according to the third embodiment of the present invention.
Figure 6B:
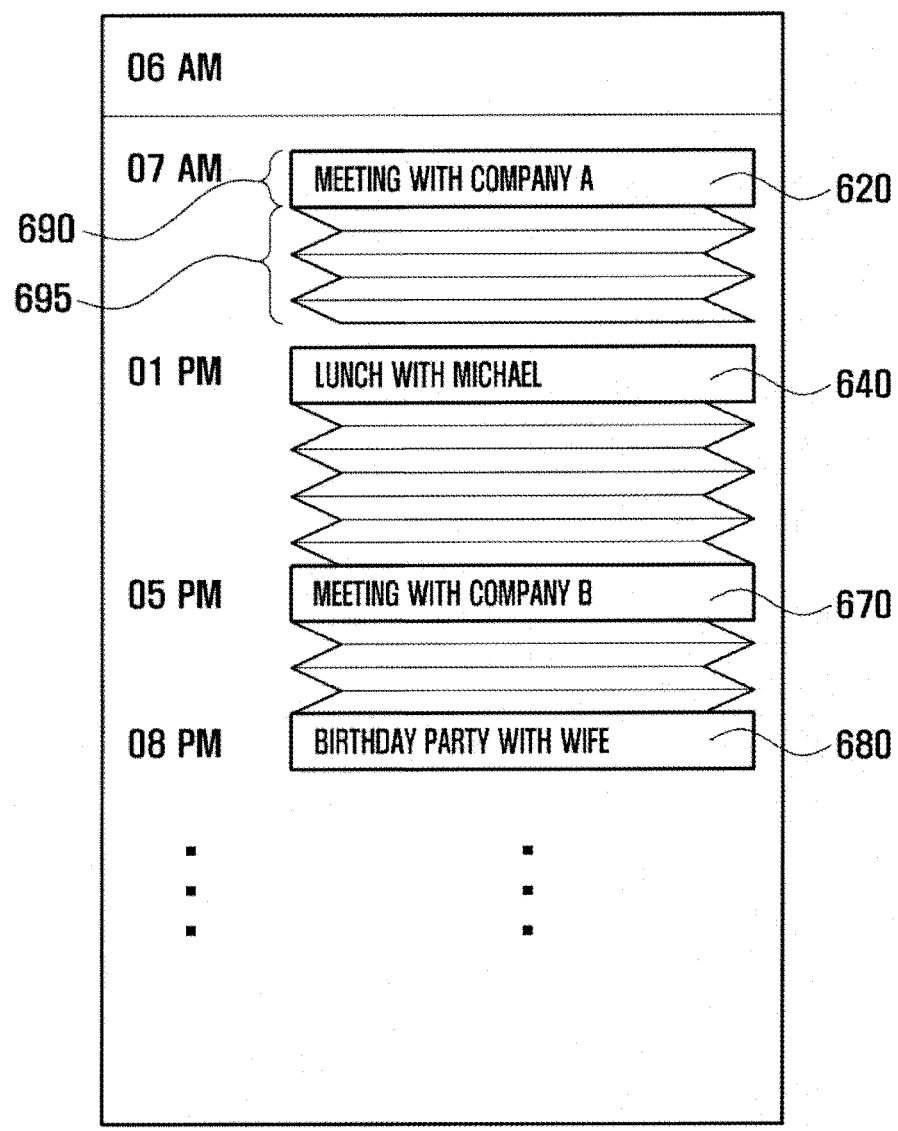
FIG. 6B is a diagram illustrating an exemplary schedule list configured with the shown-information items in the information display method according to the third embodiment of the present invention.

FIGS. 6A and 6B are diagram illustrating exemplary steps of the information display method of a mobile terminal according to the third embodiment of the present invention.

When entering a daily schedule menu, the mobile terminal 100 displays a schedule list organized by time interval as shown in FIG. 6A. In FIG. 6A, the schedule list includes the items 601, 602, and 603. Reference number 601 can be classified into non-scheduled item, and reference number 602 can be classified into schedule item. In this case, each of the schedules 615 and 640 includes a title 620 (650) and a schedule content 630 (660). Since it is important to identify the schedule for a specific time interval in the schedule list, the schedule title can be assumed as the representative information.

The control unit 160 detects a user input for the information display configuration. If the user input is detected, the control unit 160 analyzes the items of the schedule list according to a predetermined rule to classify into the shown-information items and hidden-information items. For this purpose, the control unit 160 determines each of the items 601, 602, 603, . . . contains information. Then, the control unit 160 configures the non-scheduled items, i.e. the items having no information, as hidden-information items.

Next, the control unit 160 determines whether to display all of the scheduled items on the display unit 132. In this case, the schedule list can be preconfigured such that, when the information display configuration command is input, the items having the representative information are displayed. Here, the schedule titles 620 and 650 can be the representative information in the schedule list. That is, the control unit 160 can configure the items having a specific title as the shown-information items as these items are more relevant in this mode. Accordingly, the control unit 160 identifies the items having the representative information to be displayed on the display unit 132, as shown in FIG. 6(B).

FIG. 6B is a diagram illustrating a screen outputting a contact list having the shown-information items according to the third embodiment of the present invention.

As shown in FIG. 6B, the display unit 132 displays the schedule list having at least one shown-information region 690 and at least one hidden-information region 695 as the result of the information display method according to the third embodiment of the present invention. The shown-information region 690 is used to present the titles 620, 640, 670, and 680 of the shown-information items, and the hidden information region 695 is processed as blank space or in the form of icon or text for indicating existence of hidden-information item, so that the user can see more of the relevant information in a single screen to minimize the scrolling action. Here, the hidden-information region 695 can be presented in the shape of multiply folded paper, rounded curves, or partially overlapped bars.

Fourth Embodiment

Figure 7A:
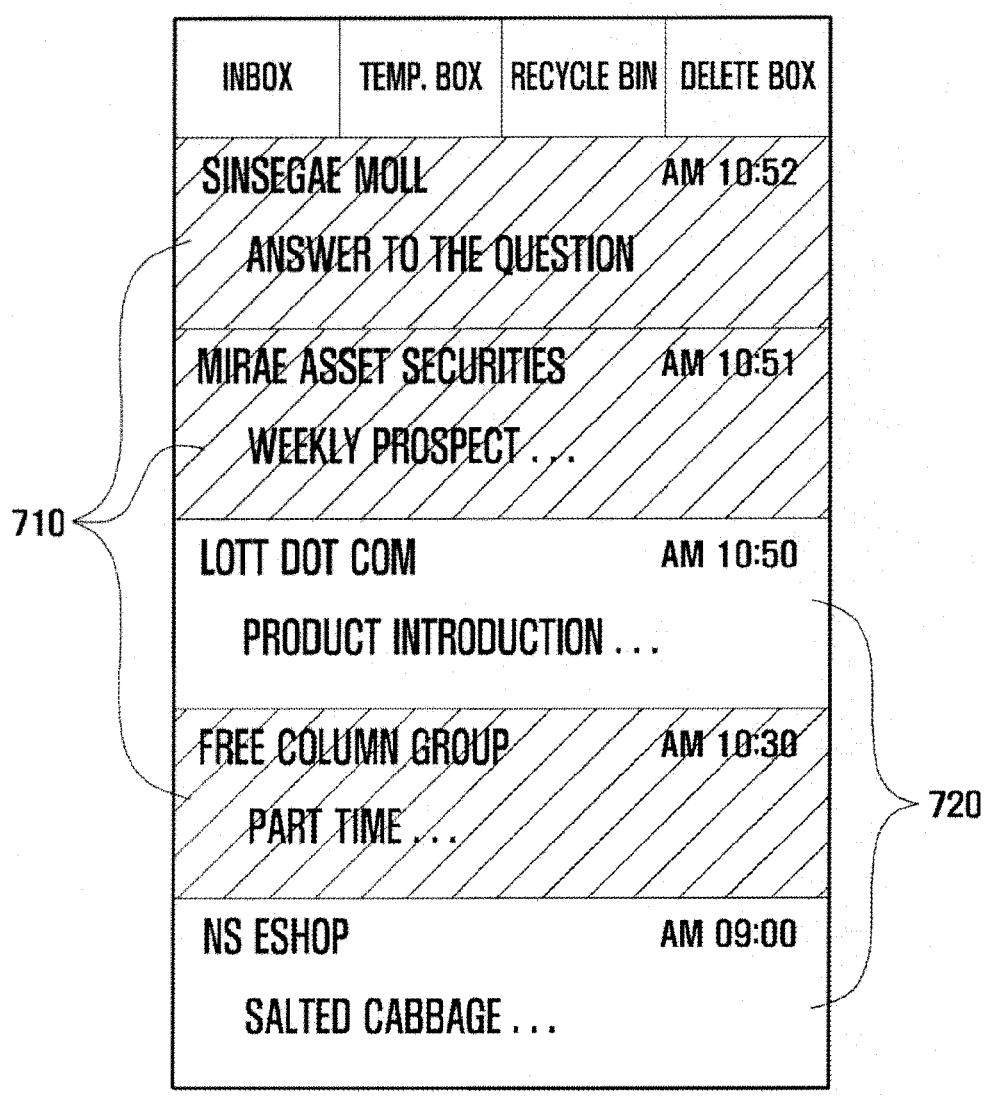
FIG. 7A is a diagram illustrating an exemplary initial email list displayed when entering an email list menu in the information display method according to the fourth embodiment of the present invention.

FIGS. 7A and 7B are diagrams illustrating exemplary steps of the information display method of a mobile terminal according to the fourth embodiment of the present invention.

When entering an email menu, the mobile terminal 100 displays a list of emails as shown in FIG. 7A which includes the unread email items 710 (indicated by shade lines) and read email items 720. During this mode, the predefine rule can set to display a list of the unread email items. To this end, the unread email items 710 are assigned a priority higher than that assigned to the read email items 720.

The control unit 160 detects a user input requesting for information display configuration analyzes the information items to classify into shown-information items and hidden-information items. The control unit 160 first determines whether each of the information items contains user-intended information. In this embodiment, it is assume that each of the email items 710 and 720 contain the user-intended information, e.g. email content.

Next, the control unit 160 determines whether to display all of the email items 710 and 720 in the email list by means of the display unit 132. In this case, the email list can be preconfigured so as to show only the unread email items. For this purpose, the control unit 160 identifies the email items containing the representative information or assigned the high priority among all of the email items 710 and 720.

Accordingly, the unread email items 710 can be assigned the priority higher than that assigned to the read email items 720 in the email list. Thus, the control unit 160 configures the unread email items 710 as shown-information items and the read email items 720 as hidden-information items.

Next, the control unit 160 controls such that an unread email list including only the unread email items 710 on the display unit 132.

FIG. 7B is a diagram illustrating a screen outputting only the unread email items according to the fourth embodiment of the present invention.

As described above, the information display method and apparatus of the present invention is capable of generating a list having only the information items containing user-intended or desired information while the rest information items are removed or hidden, thus resulting in improvement of utilization efficiency of size-constrained display screen.

Also, the information display method and apparatus of the present invention is capable of generating a list in which the information items are sorted by priority such that the user can search for the target information item quickly.

Furthermore, the information display method and apparatus of the present invention is capable of classifying information items into shown-information items and hidden-information items, then displaying only the shown information items with the decoratively shrunk hidden-information items, thereby providing aesthetic user interface.

The above-described methods according to the present invention can be realized in hardware or via the execution software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. An electronic device comprising:
 a control circuitry;
 a storage device electrically coupled to the control circuitry and configured to store an operating system and one or more application programs; and
 a touch screen electrically coupled to the control circuitry, wherein the touch screen includes a touch sensor and a display that includes a vertical side and a horizontal side perpendicular to the vertical side, wherein the storage device stores instructions that, when executed, cause the electronic device:
to run one of the application programs,
to display a plurality of indexed data items with indices for the one of the application programs, wherein the indices are aligned parallel to the horizontal side of the touch screen, and
to further display one or more indexed data items, between two of the indices on the display,
wherein each of the data items includes at least one of a text or an image, and wherein at least one of the data items further includes at least one area that is indicative of priority or pre-designation by a user,
wherein the control circuitry is further configured to receive a touch input on one of the indices through the touch sensor, and
wherein the control circuitry is configured to vertically move at least one of the indices including an index corresponding to the touch input, while hiding at least one of the data items associated with the indices corresponding to the touch input, in response to the input on the one of the indices.

2. The electronic device of claim 1, wherein the at least one area of the data items that is indicative of priority or pre-designation is marked according to a frequency of use.

3. The electronic device of claim 1, wherein the at least one area that is indicative of priority or pre-designation is marked when one of the data items is a pre-designated favorite item.

4. The electronic device of claim 1, wherein the at least one area that is indicative of priority or pre-designation comprises a symbol area providing the priority or pre-designation by having the symbol area marked or not.

5. The electronic device of claim 4, wherein the symbol area comprises a star-shaped symbol.

6. The electronic device of claim 1, wherein the at least one area that is indicative of priority or pre-designation by the user is located adjacent to the vertical side.

7. The electronic device of claim 1, wherein each of the and data items includes a text and an image.

8. The electronic device of claim 1, wherein the text includes at least two lines of texts aligned parallel to the horizontal side.

9. A method of operating an electronic device, the method comprising:
running one of application programs stored in a storage circuitry of an electronic device;
displaying a plurality of indices for the one of the application programs on a touch screen, wherein the touch screen includes a touch sensor and a display that includes a vertical side and a horizontal side perpendicular to the vertical side and shorter than the vertical side;
displaying a plurality of data items indexed by the indices between two of the indices items;
receiving a touch input on one of the indices through a touch sensor; and
vertically moving at least one of the indices items including an index corresponding to the touch input, while hiding at least one of the data items associated with the indices corresponding to the touch input in response to the touch input,
wherein each of the data items includes a text or an image, and further includes at least one area that is indicative of priority or pre-designation by a user.

10. The method of claim 9, further comprising:
marking the at least one area of the data items that is indicative of priority or pre-designation according to a frequency of use.

11. The method of claim 9, further comprising:
marking the at least one area that is indicative of priority or pre-designation when the data item is a pre-designated favorite item.

12. The method of claim 9, wherein the at least one area that is indicative of priority or pre-designation comprises a symbol area providing the priority or pre-designation by having the symbol area marked or not.

13. The method of claim 12, wherein the symbol area comprises a star-shaped symbol.

14. The method of claim 9, wherein the at least one area that is indicative of priority or pre-designation by the user is located adjacent to the vertical side.

15. The method of claim 9, wherein each of the data items includes a text and an image.

16. The method of claim 9, wherein the text includes at least two lines of texts aligned parallel to the horizontal side.

* * * * *